Figure 1:
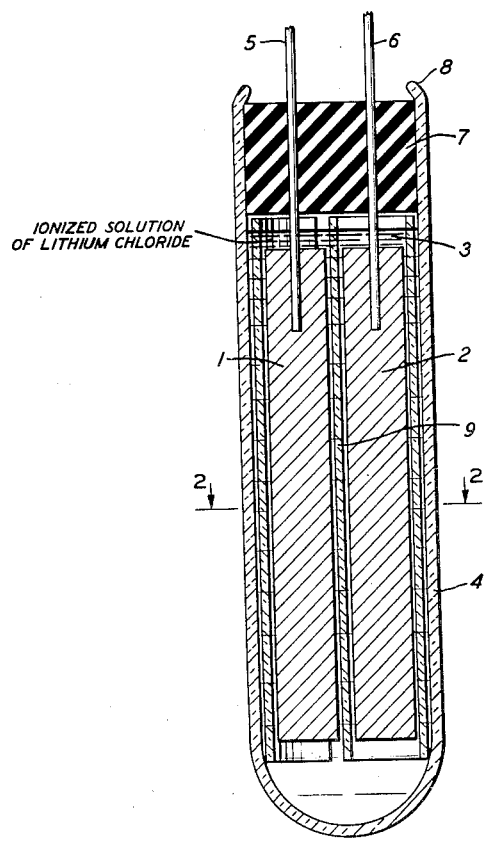

Feb. 6, 1945.  R. L. TAYLOR  2,368,688
ELECTROLYTIC DEVICE
Filed Jan. 21, 1943

INVENTOR
R. L. TAYLOR
BY
B. H. Jackson
ATTORNEY

Patented Feb. 6, 1945

2,368,688

UNITED STATES PATENT OFFICE 2,368,688

ELECTROLYTIC DEVICE

Raymond L. Taylor, New Providence, N. J., assignor to Bell Telephone Laboratories, Incorporated, New York, N. Y., a corporation of New York Application January 21, 1943, Serial No. 473,057

10 Claims. (Cl. 175—315)

This invention relates to electrolytic devices, and more particularly to electrolytic devices each of which includes an electrolyte contacting at least two electrodes, at least one of which electrodes comprises a body of film-forming metal coated with an oxide film.

Electrolytic devices embodying the invention may be advantageously employed as electrolytic condensers or as electrolytic rectifiers.

The filmed electrode of an electrolytic device embodying the present invention is one which is resistant to corrosion when exposed to substantial concentrations of anions of strong acids in substantial quantities; it is formed of tantalum, zirconium, titanium, columbian or similar film-forming corrosion-resistant metal and has an oxide film anodically formed on the surface of the electrode in contact with the electrolyte. A filmed electrode formed of tantalum is the most advantageous because the metal has high corrosion resistance, excellent film-forming properties, and is the most readily available and lowest priced metal of this type.

For the purposes of illustration the invention will be discussed in connection with electrolytic condensers having at least one filmed tantalum electrode.

Because of the corrosion resistance of the tantalum and the stability of the oxide film formed thereon, condensers having filmed tantalum electrodes have a potentially indefinite life of satisfactory operation; deficiencies of the electrolytes heretofore employed in general have been the factors limiting the life or causing difficulties in operation of such condensers.

The deleterious effects of deficiencies of the electrolytes in general are accentuated when filmed porous tantalum electrodes are employed. Great advantages, however, are provided when such electrodes are employed since the porosity greatly increases the surface area of the electrodes and hence the area of the oxide film constituting the dielectric of the condenser. Thus a large capacity is obtainable in a condenser of small size when it has a filmed porous tantalum electrode.

When a filmed porous tantalum electrode is employed it is necessary that the electrolyte be highly conductive, due to the length and constricted nature of the passages within the porous electrode to the surfaces of which electrical contact must be made by the electrolyte.

The electrolyte should have good film-forming and film-maintaining properties to assure stability of the oxide film of the tantalum electrode during operation and idleness. The electrolyte itself should be stable over long periods of operation of the condenser and should not break down or decompose since this shortens the life of the condenser.

The electrolyte should have a temperature coefficient of conductivity which is low so that conductivity and operating characteristics of the condenser do not change substantially with changes in temperature. This is extremely important in condensers which are to be used in circuits where stability of operating characteristics is necessary, as in telephone or radio circuits. A low freezing point of the electrolyte is also advantageous and desirable since electrolytic condensers often are employed in places where low temperatures are encountered.

It is advantageous that the electrolyte offer a minimum of corrosion hazard to associated apparatus, since electrolyte from such a condenser occasionally contacts other portions of the apparatus because of spilling, leakage, or condenser breakage.

Practically all electrolytes employed heretofore in electrolytic condensers having filmed tantalum electrodes have been seriously deficient in the above desiderata. However, the greatest difficulties by far have been caused by tendencies of the prior electrolytes to evaporate; loss of electrolyte for this reason has been the primary cause of limitation on the useful life of prior condensers. It is highly advantageous that the electrolyte have a low vapor pressure so as to minimize or prevent evaporation of the electrolyte and thus to provide the desired long life of the condensers.

Electrolytes having most, if not all, of the above-indicated desirable properties are provided by the present invention. According to the present invention an electrolytic device, such as an electrolytic condenser, having a filmed electrode formed of a suitable corrosion resistant material, such as tantalum, is provided with an electrolyte comprising an ionized solution of lithium chloride, which solution contains a substantial amount of the salt.

Figure 2:
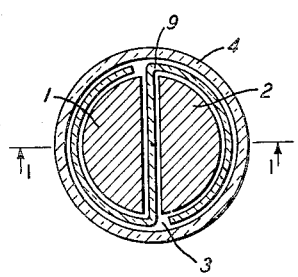

For illustrative purposes, the invention will be discussed in connection with the accompanying drawing, in which:

Fig. 1 represents a sectional elevation to an enlarged scale through an electrolytic condenser embodying the invention; and Fig. 2 represents a cross-sectional elevation along the line 2—2 of Fig. 1 of said condenser.

In the device of the drawing, the electrodes I and 2 are immersed in a liquid electrolyte 3 disposed in a container 4. The lead wire 5 for electrode 1 and lead wire 6 for electrode 2 extend through the sealing member 7 which is held in place by the turned-in edge 8 of the container 4. Spacer 9 separates the electrodes 1 and 2. Said spacer 9 is bent into an approximately S-shape as shown to secure it in place and to insure the separation of the electrodes 1 and 2.

In the illustrated embodiment, electrode 1 is formed of porous sintered tantalum, although it may be formed of other similar corrosion-resistant film-forming metals such as zirconium or columbium. Electrode 1 has formed thereon a thin oxide film having dielectric properties. Preferably, the film is formed on the electrode before it is built into the condenser. This may be done, for example, by subjecting the electrode as an anode, while it is immersed in a boiling solution of about 25 grams of ammonium chloride in 100 cubic centimeters of water, to an approximately constant current until the desired voltage is reached, after which formation is continued at that voltage until the forming current decreases to a predetermined value.

If the condenser is intended to be a non-polar condenser, the electrode 2 is similar in that it comprises a body of porous sintered tantalum or equivalent film-forming metal coated with an oxide film of dielectric properties. If the condenser is to be a polar condenser the electrode 2 is formed of a suitable material which does not have a dielectric film thereon, such as tantalum, molybdenum, palladium, alloys including these metals, lead, or carbon, which materials may be non-porous or porous and are preferably the latter because of the larger surface contact thus provided with the electrolyte.

The container 4 may be formed of suitable non-conductive material, such as glass or synthetic resin. The sealing member 7 is advantageously formed of rubber or other elastic material which is resistant to the action of the electrolyte and substantially, if not entirely, impervious to moisture. It tightly seals the lead wires 5 and 6 and tightly contacts the sides of the container 4 to prevent the escape of the liquid electrolyte, although it permits the escape of gas which may be developed within the condenser.

Spacer 9 may be formed of suitable non-conductive material which is not attacked by the electrolyte and which is perforated, reticulated, woven or the like. The spacer 9 shown in the illustrated embodiment is woven spun glass fabric.

The electrolyte 3 in this embodiment comprises an ionized solution of lithium chloride. While certain polar solvents may be employed, it is most advantageous to employ water as the solvent. Various concentrations of the salt may be employed, but in any event it is desirable that a substantial amount of the salt be dissolved in the solvent. At room temperature, lithium chloride has a solubility in water of approximately 13 mols of salt per liter of solution; the actual concentration to be employed is largely determined by the conductivity of the solution which is desired and by the vapor pressure which is desired.

An electrolyte comprising an ionized solution containing a substantial proportion of lithium chloride is very stable, has excellent film-forming and film-maintaining properties, has good electrical conductivity, a low temperature coefficient of conductivity, low freezing point, minimum corrosion hazard and may have a highly advantageous low vapor pressure to inhibit evaporation and loss of electrolyte.

An electrolyte embodying the invention which provides exceptional advantages is a water solution of lithium chloride containing from 34 to 42 grams of lithium chloride per 100 cubic centimeters of solution, which corresponds to about between 8 and about 10 mols of lithium chloride per liter of solution. This electrolyte has a high conductivity, the specific resistivity of a 9 mol solution, for example, is about 6.8 ohm-centimeters at 25° C. which renders it advantageous for use with porous as well as non-porous electrodes. Such electrolyte has a relative vapor pressure of slightly less than 0.5 which will maintain a relative humidity within the condenser of less than 50 per cent so that little, if any, evaporation will occur from the electrolyte. The electrolyte has an exceptionally low freezing point which is less than $-50°$ C. It has a temperature coefficient of conductivity which is low. The concentration of salt in this electrolyte is an optimum concentration, since the electrolyte employing this concentration possesses the optimum combination of good conductivity, vapor pressure sufficiently low to minimize or prevent evaporation, and low freezing point. The electrolyte also has film-maintaining and film-forming properties which are unexpectedly good; these properties are extremely advantageous for they increase the stability of the oxide film both during operation and idleness of the condenser and provide for rapid healing and low initial leakage currents. This electrolyte is very stable over long periods of operation of the condenser. This electrolyte moreover provides much less hazard of corrosion to other apparatus with which it may come into contact in the event of spilling, leakage, or condenser breakage, than is the case with acid electrolytes.

Because of the stability of this electrolyte, its excellent film-forming and film-maintaining properties, and its low vapor pressure, this electrolyte does not decompose or evaporate substantially, if at all, at temperatures and humidities ordinarily encountered in operation of electrolytic devices, so that little or no loss of electrolyte occurs and hence extremely long life of the condenser is made possible.

Electrolytes embodying the invention may be employed in electrolytic condensers of different designs from those indicated above, or in other types of electrolytic devices such as electrolytic rectifiers. Electrolytes of the present invention containing lithium chloride may also contain other substances; for example, they may contain lithium chloride and another ionogen such as ammonium chloride. If desired, other substances such as gelatinizing agents may be employed in an electrolyte embodying the invention to form a solid or semisolid electrolyte which will not flow readily, if at all, and hence which will reduce the possibility of leakage. Examples of such agents are gelatin, lignin, and glycol resins. Various other modifications may be made in the apparatus and electrolytes disclosed above as embodying the invention without departing from the spirit of the invention.

It is intended that the patent shall cover, by suitable expression in the appended claims, whatever features of patentable novelty residue in the invention.

What is claimed is:

1. An electrolytic condenser comprising a filmed tantalum electrode, another electrode, and an electrolyte contacting said electrodes comprising an ionized solution of lithium chloride.

2. An electrolytic condenser comprising two filmed tantalum electrodes, and an electrolyte contacting said electrodes comprising an ionized solution of lithium chloride.

3. An electrolytic condenser comprising a filmed tantalum electrode, another electrode formed of unfilmed electrically conductive material, and an electrolyte contacting said electrodes comprising an ionized solution of lithium chloride.

4. An electrolytic condenser comprising a filmed tantalum electrode, another electrode, and an electrolyte contacting said electrodes comprising a water solution containing between about 8 and about 10 mols of lithium chloride per liter of solution.

5. An electrolytic condenser comprising an electrode formed of a corrosion resistance film-forming metal coated with a dielectric oxide film, another electrode, and an electrolyte contacting said electrodes comprising an ionized solution of lithium chloride.

6. An electrolytic condenser comprising an electrode formed of a corrosion resistant film-forming metal coated with a dielectric oxide film, another electrode, and an electrolyte contacting said electrodes comprising a water solution containing between about 8 and about 10 mols of lithium chloride per liter of solution.

7. An electrolytic device of the type in which is required maximum permanent stability and freedom from decomposition of the electrolyte comprising an electrode formed of a corrosion resistant film-forming metal coated with a dielectric oxide film, another electrode, and an electrolyte contacting said electrodes comprising lithium chloride.

8. An electrolytic device of the type in which is required maximum permanent stability and freedom from decomposition of the electrolyte comprising an electrode formed of a corrosion resistant film-forming metal coated with a dielectric oxide film, another electrode, and an electrolyte contacting said electrodes comprising a water solution containing between about 8 and about 10 mols of lithium chloride per liter of solution.

9. An electrolytic device of the type in which is required maximum permanent stability and freedom from decomposition of the electrolyte comprising a filmed tantalum electrode, another electrode, and an electrolyte contacting said electrodes comprising an ionized solution of lithium chloride.

10. An electrolytic device of the type in which is required maximum permanent stability and freedom from decomposition of the electrolyte comprising a filmed tantalum electrode, another electrode, and an electrolyte contacting said electrodes comprising a water solution containing between about 8 and about 10 mols of lithium chloride per liter of solution.

RAYMOND L. TAYLOR.